United States Patent
Posont

(10) Patent No.: US 6,752,059 B1
(45) Date of Patent: Jun. 22, 2004

(54) ANGLE GUIDE FOR SAWS

(76) Inventor: Joseph H. Posont, 6437 S. Urban Ct., Littleton, CO (US) 80127

( * ) Notice: Subject to any disclaimer, the term of this patent is extended or adjusted under 35 U.S.C. 154(b) by 0 days.

(21) Appl. No.: 09/453,798

(22) Filed: Dec. 3, 1999

(51) Int. Cl.[7] .............................. B27B 9/04; B27B 11/02
(52) U.S. Cl. ...................... 83/745; 83/522.18; 83/761; 83/829; 33/499; 33/500
(58) Field of Search .................. 83/761, 745, 767, 83/743, 829, 486.1, 581, 522.15, 522.16, 522.17, 522.18, 522.19; 33/418, 469, 471, 496, 497, 498, 499, 500, 628, 43, 456, 465, 468

(56) References Cited

U.S. PATENT DOCUMENTS

| | | | | |
|---|---|---|---|---|
| 438,350 A | * | 10/1890 | Kingsbury | 33/418 |
| 518,759 A | * | 4/1894 | Jewell | 33/469 X |
| 622,530 A | * | 4/1899 | Pernot | 83/761 |
| 840,628 A | * | 1/1907 | Johnson | 33/471 |
| 841,627 A | * | 1/1907 | Cloud, Jr. | 33/497 |
| 1,034,068 A | * | 7/1912 | Bley | 33/469 |
| 1,114,658 A | * | 10/1914 | Watters | 33/418 X |
| 1,145,719 A | * | 7/1915 | Tucker | 33/471 |
| 1,210,370 A | * | 12/1916 | Dvorak | 33/418 X |
| 1,295,399 A | * | 2/1919 | Wells | 33/418 |
| 1,351,527 A | * | 8/1920 | Lopez | 33/499 |
| 1,700,189 A | | 1/1929 | Wikstrom | 30/376 |
| 1,797,213 A | * | 3/1931 | Marcum | 33/499 |
| 2,661,034 A | * | 12/1953 | MacDonald | 83/767 X |
| 2,822,834 A | * | 2/1958 | Hammers | 33/497 |
| 2,906,303 A | * | 9/1959 | Abel | 33/499 |
| 2,942,634 A | * | 6/1960 | Gathercoal | 83/761 |
| 3,516,457 A | | 6/1970 | Winters | 30/376 |
| 3,536,112 A | | 10/1970 | Kordyban | 30/376 |
| 3,584,663 A | | 6/1971 | Yacobucci | 30/376 |
| 3,586,075 A | | 6/1971 | Larsen | 30/376 X |
| 4,128,030 A | * | 12/1978 | Kundikoff | 83/745 |
| 5,020,233 A | * | 6/1991 | Syken | 33/418 X |
| 5,187,877 A | * | 2/1993 | Jory et al. | 33/471 X |
| 5,687,628 A | * | 11/1997 | Liao | 83/761 X |
| 5,713,134 A | | 2/1998 | Stevens | 30/376 |
| 5,815,933 A | | 10/1998 | Staniszewski | 30/376 |

* cited by examiner

Primary Examiner—Clark F. Dexter
(74) Attorney, Agent, or Firm—Ancel W. Lewis, Jr.

(57) ABSTRACT

A guide for guiding a hand held saw is disclosed. The guide has a locating member for locating the guide relative to an edge and a guiding member that guides the saw. The guiding member can be locked at any angle between 0 and 90 degrees relative to locating member and is invertible so that angles between 90 to 180 degrees can be guided. The guide has an angle gauge and also stops for 45 and 90 degrees. A clamp interfits with the locating member to quickly secure the guide to the material to be cut.

8 Claims, 2 Drawing Sheets

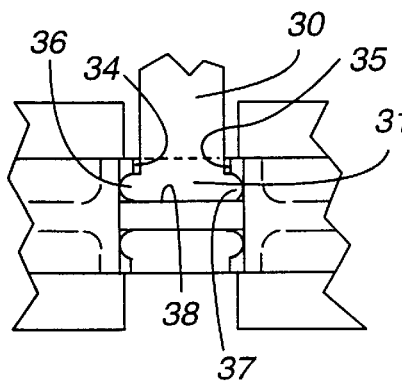
Fig. 6
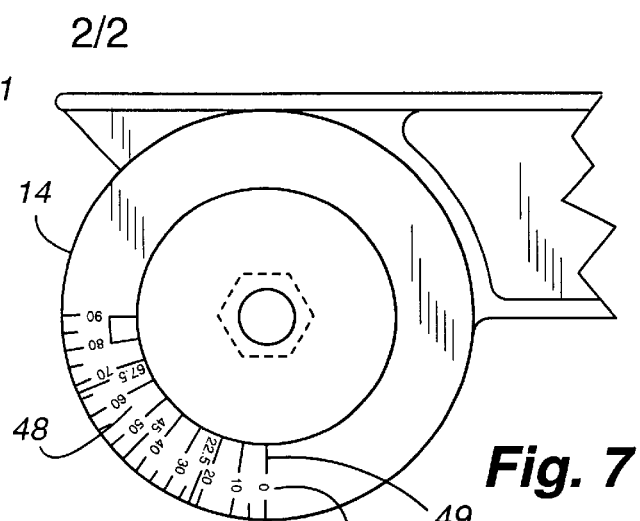
Fig. 7
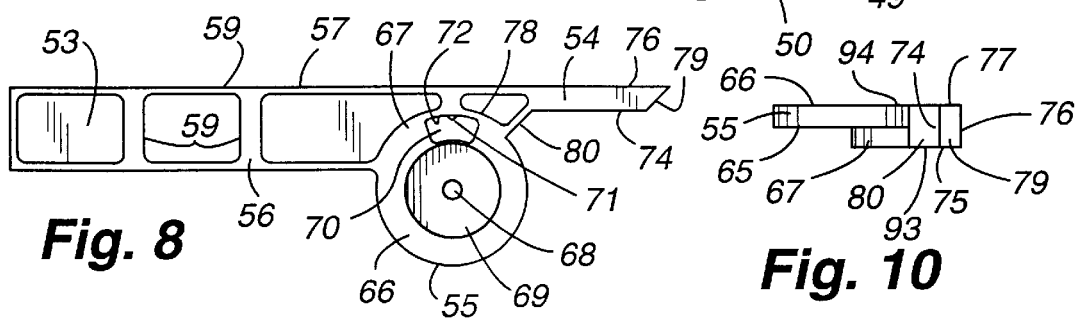
Fig. 8
Fig. 10
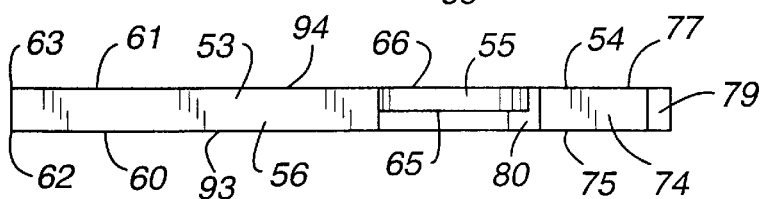
Fig. 9
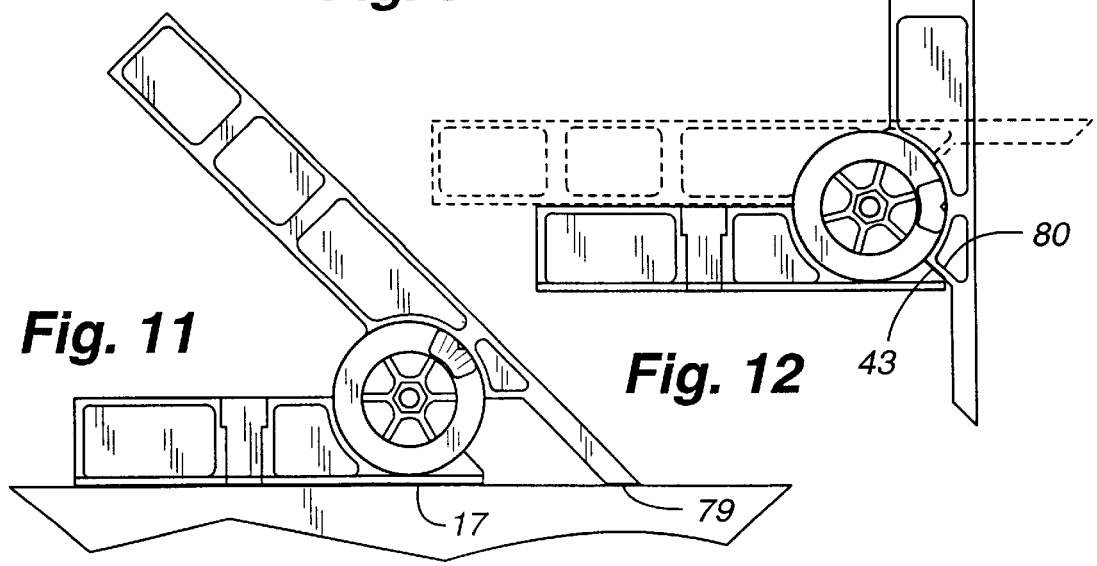
Fig. 11
Fig. 12

ANGLE GUIDE FOR SAWS

TECHNICAL FIELD

The present invention relates to guides for saws and more particularly to a portable guide for saws that is adjustable through the range of 0 to 180 degrees and includes precise mechanical adjustment to 45, 90 and 135 degrees.

BACKGROUND ART

Hand held saws, such as jig saws, saber saws, circular saws and the like, are used extensively to cut sheet, board and beam materials such as wood or plastic. Guides for these saws aid in cutting the material along a straight line at a selected angle. Such guides include a means for locating the guide relative to an edge of the material and a means for guiding the saw. For use at a building site, a fully integrated guide is needed that is simple, easy to use, lightweight and durable. Such a guide should include a means for clamping the guide to the material being cut, a means for selecting the angle and a means for manually locking the guide without tools at the selected angle. The ability to quickly and precisely set the guide to common angles would also be beneficial.

Some simple saw guides function over a limited range of angles. U.S. Pat. No. 1,700,189 to Wikstrom discloses a simple guide that is usable over a range of about 45 degrees to 90 degrees. This guide has a locking means that includes a link, a slot and a bolt that must be tightened with a tool. If this guide is inverted, the guide is still limited to the same range. If the material to be cut can be turned over, this type of guide can be used over twice the range. When the material cannot be turned over, a guide that has a range of 0 to 180 degrees is needed.

U.S. Pat. No. 5,713,134 to Stevens discloses a simple guide for a chain saw for cutting beams that is usable over about 180 degrees and includes an angle gauge. The guide is nailed to the beam and there is no means for locking the locating means at a selected angle relative to the guiding means.

Other saw guides are cumbersome, awkward or complex. These guides have tracks, tables or large templates, and are best used when the material can be brought to the guide. Track type guides are disclosed in U.S. Pat. No. 3,536,112 to Kordyban, U.S. Pat. No. 3,584,663 to Yacobucci, and U.S. Pat. No. 5,815,933 to Staniszewski disclose guides with tracks. U.S. Pat. No. 3,586,075 to Larsen and U.S. Pat. No. 3,516,457 to Winters disclose large template type miter guides.

DISCLOSURE OF THE INVENTION

A guide for saws is disclosed including a locating member, a guiding member pivotally connected to and rotatable over 90 degrees relative to the locating member, and a locking means for manually locking the guiding member at a selected angle relative to the a locating member. The locating member has opposed protruding first and second flanges and the guide is invertible with the flanges alternately locating the guide to provide a range of angles over 180 degrees. A clamp slidably attached in one of opposed first and second slots in the locating member secures the locating member to the material being cut. The guide includes an angle gauge for visually setting the guide to any selected angle and positive stops for precisely setting the guide to 45 or 90 degrees without visual reference to the angle gauge. The locking means includes relatively large diameter circular mating faces that are pressed together to lock the angle between the locating member and the guiding member.

BRIEF DESCRIPTION OF THE DRAWINGS

Details of this invention are described in connection with the accompanying drawings that bear similar reference numerals in which:

FIG. 6 is an enlarged side view of the clamp slots of the locating member of the guide of FIG. 1.

FIG. 7 is an enlarged top view of the angle gauge of the locating member of the guide of FIG. 1.

FIG. 8 is a top view of the guiding member of the guide of FIG. 1.

FIG. 9 is a side view of the guiding member of the guide of FIG. 1.

FIG. 10 is an end view of the guiding member of the guide of FIG. 1.

FIG. 11 is a top view of the guide of FIG. 1 set at 45 degrees.

FIG. 12 is a top view of the guide of FIG. 1 set at 90 degrees, the folded position shown in dashed lines.

DETAILED DESCRIPTION OF THE INVENTION

Figure 1:
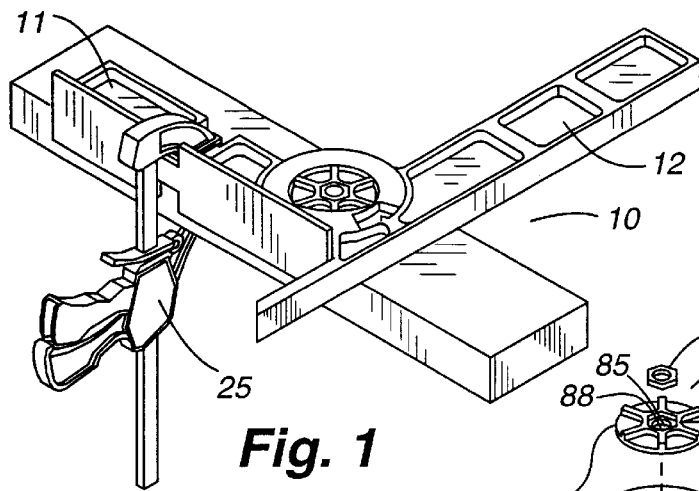
FIG. 1 is a perspective view of the guide embodying features of the present invention.
Figure 2:
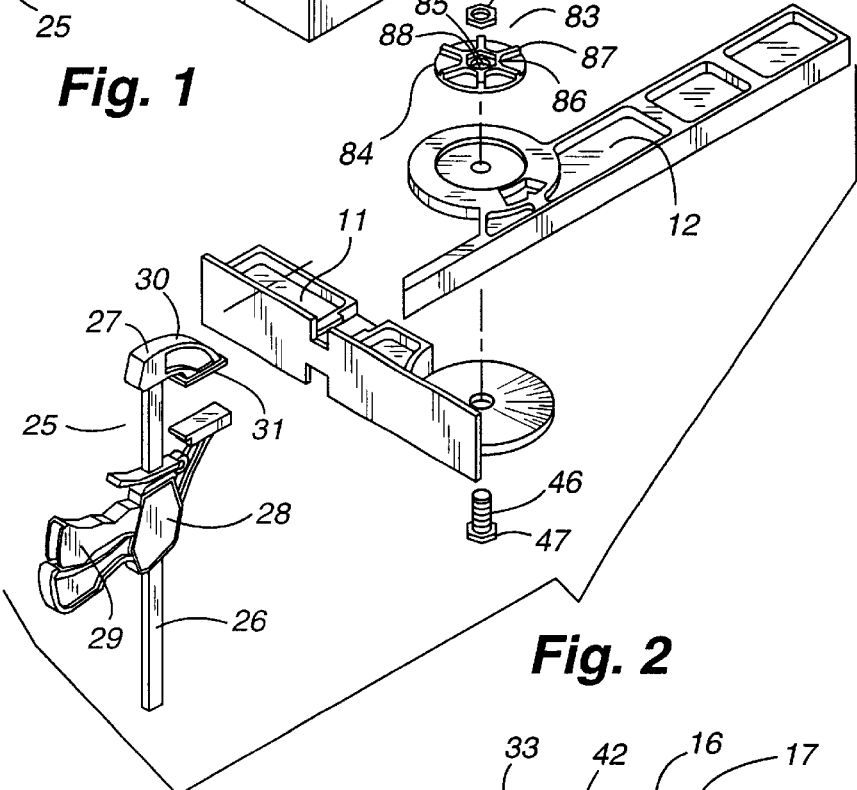
FIG. 2 is an exploded perspective view of the guide of FIG. 1.

Referring now to FIGS. 1 and 2, a guide 10 embodying features of the present invention is shown, including a locating member 11 and a guiding member 12 pivotally connected to the locating member 11. The locating member 11 locates the guide 10 relative to the material being cut and the guiding member 12 guides a saw cutting the material.

Figure 3:
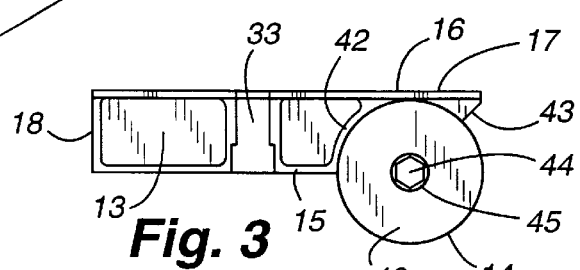
FIG. 3 is a bottom view of the locating member of the guide of FIG. 1.
Figure 4:
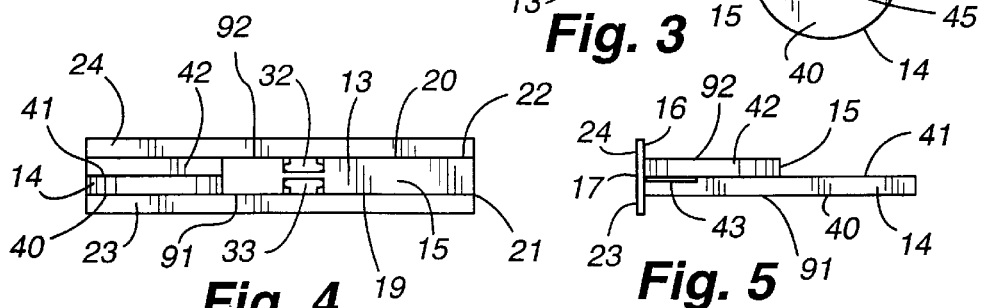
FIG. 4 is a side view of the locating member of the guide of FIG. 1.
Figure 5:
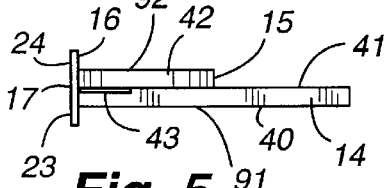
FIG. 5 is an end view of the locating member of the guide of FIG. 1.

FIGS. 3, 4 and 5 show the locating member 11 including an elongated portion 13, and a disk shaped or cylindrical portion 14. The elongated portion 13 includes an elongated inner wall 15, a straight elongated outer wall 16 spaced from the inner wall 15 and having a flat outer face 17, and webs 18 connecting the inner wall 15 and the outer wall 16. The inner wall 15 has opposed spaced first and second edge 19 and 20 extending the length thereof. The webs 18 have opposed spaced first and second edges 21 and 22 extending the length thereof. The first edges 19 and 21 of the inner wall 15 and the webs 18 are coplanar to form a first support surface 91 to support the locating member 11 on the material being cut. The second edges 20 and 22 of the inner wall 15 and the webs 18 are also coplanar, and when the locating member is turned over, second edges 20 and 22 form a second support surface 92 to support the locating member 11 on the material being cut.

The outer wall 16 extends beyond the first edges 21 of webs 18 to form a first flange 23 and beyond the second edges 22 of webs 18 to form a second flange 24. When the locating member 11 is positioned with the first edges 19 and 21 of the inner wall 15 and the webs 18 on a material to be cut, the first flange 23 is the first locating means that positively positions the locating member 11 along an edge of the material. When the locating member 11 is positioned with the second edges 20 and 22 of the inner wall 15 and the webs 18 on a material to be cut, the second flange 24 is the second locating means that positively positions the locating member 11 along an edge of the material. Alternative structure, such as two extending pins that locate the locating member 11 relative to an edge, may be used to form the first locating means or the second locating means.

FIG. 2 shows a clamp 25 that secures the guide 10 to the material being cut. A clamp particularly suitable for use in the present invention is a Quick Grip from American Tool Companies, Inc., DeWitt, Nebr. Other clamps such C clamps or other bar clamps are also suitable for use in the present invention. Clamp 25 includes a bar 26, a fixed jaw 27 at one end of the bar 26, a movable jaw 28 opposite the fixed jaw 27 and slidable along the bar 26, and tightening means 29 that tightens the movable jaw 28 against an item being clamped and secures the movable jaw 28 relative to the bar 26. The fixed jaw 27 and the movable jaw 28 each have a leg 30 that extends away from bar 26 and inward toward the opposing jaw, and a foot 31 perpendicular to the bar 26 at the end of the leg 30 that is away from the bar 26.

Referring to FIGS. 4 and 6, the elongated portion 13 of the locating member 11 includes opposed first and second clamp slots 32 and 33 for alternately receiving the foot 31 of the fixed jaw 27 or movable jaw 28 of the clamp 25. The first clamp slot 32 includes opposed, spaced, inward facing first and second side faces 34 and 35 that extend from second edges 22 of webs 18 and from the inner face 15 into the elongated portion 13, and opposed, spaced, concave first and second grooves 36 and 37 that extend into the elongated portion 13 from the inner face 15 along the inward extent of first and second side faces 34 and 35, respectively. A base face 38, that is parallel to the second edges 22 of webs 18, extends between the inner extent of the first and second grooves 36 and 37 to form the bottom of first clamp slot 32. Thus the first clamp slot has an inverted T shape when viewed from the inner face 15.

The first and second grooves 36 and 37 are sized and shaped to receive the edges of the foot 31 so that the clamp 25 is attached to guide 10 by sliding foot 31 into the first and second grooves 36 and 37 until the foot 31 contacts outer wall 16, with leg 30 extending upward and outward from first clamp slot 32 to bar 26 of clamp 25. The second clamp slot 33 is the same size and shape as the first clamp slot 32 and extends from first edges 21 of webs 18 opposite the first clamp slot 32, so that when the guide 10 is inverted, foot 31 of clamp 25 slides into the second clamp slot 33 to attach clamp 25 to guide 10.

Referring again to FIGS. 3, 4 and 5, the cylindrical portion 14 of the locating member 11 has a circular support face 40 and an oppositely facing, spaced circular mating face 41. The distance between the support face 40 and the mating face 41 of the cylindrical portion 14 is about half the thickness of the distance between the first edge 19 and the second edge 20 of the inner wall 15 of the elongated portion 13. The diameter of the cylindrical portion 14 is approximately equal to two times the distance between the inner wall 15 and outer face 17 of the elongated portion 13. The cylindrical portion 14 connects to a first end 42 of the elongated portion 13 with the support face 40 coplanar with the first edges 19 and 21 of the inner wall 15 and the webs 18, to form a continuation of the first support surface 91. The center of the cylindrical portion 14 is substantially in the plane of the inner wall 15 of the elongated portion 13 so that about half of the cylindrical portion 14 extends beyond inner wall 15. A diagonal web 43 extends radially outward at a 45 degree angle from the cylindrical portion 14 to the outer wall 16 along a line though the center of the cylindrical portion 14.

The cylindrical portion 14 of the locating member 11 includes an aperture 44 through the center from the support face 40 to the mating face 41, sized and shaped to receive an upwardly extending, externally threaded bolt 46. A hexagonal recess 45 in the support face 40, concentric with aperture 44, is sized and shaped to receive the hexagonal head 47 of bolt 46 and to prevent the head 47 from turning. FIG. 7 shows an angle gauge 48 that is formed in the mating face 41 of the cylindrical portion 14 of the locating member 11 by inscribed radial lines 49 and inscribed numbers 50.

FIGS. 8, 9 and 10 show the guiding member 12 including a first elongated portion 53, a second elongated portion 54 and a disk shaped or cylindrical portion 55. The first elongated portion 53 includes an elongated inner wall 56, a straight elongated outer wall 57 spaced from the inner wall 56 and having a flat outer face 58, and webs 59 connecting the inner wall 56 and the outer wall 57. The inner wall 56 has opposed space first and second edge 60 and 61 extending the length thereof. The outer wall 57 has opposed space first and second edge 62 and 63 extending the length thereof. The first edges 60 and 62 of the inner wall 56 and the outer wall 57 are coplanar to form a first support surface 93 to support the guiding member 12 on the material being cut. The second edges 61 and 63 of the inner wall 56 and the outer wall 57 are also coplanar, and when the guide 10 is turned over, second edges 61 and 63 form a second support surface 94 to support the guiding member 12 on the material being cut.

The distance between the first edge 60 and the second edge 61 of the inner wall 56 of first elongated portion 53 of the guiding member 12 is the same as the distance between the first edge 19 and the second edge 20 of the inner wall 15 of elongated portion 13 of the locating member 11. In the illustrated embodiment the first elongated portion 53 of the guiding member 12 is longer than the elongated portion 13 of the locating member 11.

The cylindrical portion 55 of the guiding member 12 has a circular mating face 65 and an oppositely facing, spaced, circular support face 66. The distance between the mating face 65 and the support face 66 of the cylindrical portion 55 is equal to the difference between the distance between the first edge 60 and the second edge 61 of the inner wall 56 of first elongated portion 53 of the guiding member 12 and the thickness of the cylindrical portion 14 of the locating member 11. The diameter of the cylindrical portion 55 of the guiding member 12 is the same as the diameter of the cylindrical portion 14 of the locating member 11. The cylindrical portion 55 connects to a first end 67 of the first elongated portion 53 coplanar with the second edges 61 and 63 of the inner wall 56 and the outer wall 57, to form a continuation of the second support surface 94. The center of the cylindrical portion 55 is substantially in the plane of the inner wall 56 of the first elongated portion 53 so that about half of the cylindrical portion 55 extends beyond inner wall 56.

An aperture 68, sized and shaped to receive bolt 46, extends through the center of the cylindrical portion 55 from the support face 66 to the mating face 65. The support face 66 has a recess 69, concentric with the aperture 68, for receiving a tightening means for bolt 46, as will be described hereinafter. A window 70 positioned between the recess 69 and the periphery of the cylindrical portion 55 extends through the cylindrical portion 55 between the support face 66 and mating face 65. The window 70 includes an indicator 71 centered along a radially outward side 72.

The second elongated portion 54 of guiding member 12 has a substantially rectangular cross section with an inner face 74, a first face 75, an outer face 76 and an second face 77 bounding the rectangle. The second elongated portion 54 connects to the guiding member 12 at a first end 78 and extends from the cylindrical portion 55 opposite the first elongated portion 53, with the outer face 76 of the second elongated member 54 coplanar and continuous with the outer face 58 of the outer wall 57 of the first elongated member 53. The outer faces 76 and 58 form a guiding surface for a saw. A second end 79 opposite the first end 78 is beveled at a 45 degree angle inward relative to the outer face 76 and the length of the outer face 76 is precisely selected as will be disclosed hereinafter. A diagonal web 80 extends radially outward at a 45 degree angle from the cylindrical portion 55 to the inner face 74 along a line though the center of the cylindrical portion 55.

As shown in FIG. 2, the guide 10 is assembled with the mating face 41 of the cylindrical portion 14 of the locating member 11 juxtaposed over the mating face 65 of the cylindrical portion 55 of the guiding member 12, and with the inner wall 15 of the elongated portion 13 of the locating member 11 facing the inner wall 56 of the first elongated portion 53 of the guiding member 12. The bolt 46 extends through the aperture 44 of the cylindrical portion 14 of the locating member 11 and the aperture 68 of the cylindrical portion 55 of the guiding member 12 with the head 47 of the bolt 46 in the recess 45 in the support face 40 of the cylindrical portion 14 of the locating member 11.

The tightening member 83 includes a flat round disk 84 with a center aperture 85, a hexagonal wall 86 concentric with aperture 85 and extending perpendicularly from the disk 84, and six radial spokes 87 connected to the disk 84 and to the hexagonal wall 86, and extending from wall 86 to the periphery the disk 84. The hexagonal wall 86 forms a well 88 sized and shaped to receive an internally threaded nut 89. Preferably nut 89 is a low profile nut such as a jam nut. The tightening member 83 is threaded onto bolt 46 to hold the locating member 11 and the guiding member 12 together. The recess 69 in the support face 66 of the cylindrical portion 55 of the guiding member 12 and the tightening member 83 are mutually sized and shaped such that the tightening member 83 fits into the recess 69 without extending above the plane of the support face 66. The radius of the disk 84 is large enough for fingers to readily press against the spokes 87 to tighten the nut 89, and in the illustrated embodiment about 0.75" to 1".

The indicator 71 in the window 70 in the cylindrical portion 55 of the guiding member 12 aligns over the radial lines 49 and numbers 50 inscribed in the mating face 41 of the cylindrical portion 14 of the locating member 11 to indicate the angle between the outer face 17 of the elongated portion 13 of the locating member 11 and the outer face 58 of the outer wall 57 of the first elongated portion 53 of the guiding member 12. An angle of 0 degrees is shown when the outer faces 17 and 58 are parallel and 90 degrees when the outer faces 17 and 58 are perpendicular. Alternatively, the radial lines 49 and numbers 50 of angle gauge 48 could be inscribed on the mating face 65 of the guiding member 12 with the window 70 and indicator 71 in the cylindrical portion 14 of the locating member.

Tightening the tightening member 83 on the bolt 46 presses the mating face 41 of the cylindrical portion 14 of the locating member 11 against the mating face 65 of the cylindrical portion 55 of the guiding member 12 to lock the guiding member 12 at any selected angle from 0 to 90 degrees relative to the locating member 11. The diameters of the mating face 41 of the cylindrical portion 14 of the locating member 11 and the mating face 65 of the cylindrical portion 55 of the guiding member 12 are about twice the width of the elongated portion 13 of the locating member 11 or the first elongated portion 53 of the guiding member 12. These large diameters create a large locking force, or resistance to rotation of the guiding member 12 relative to the locating member 11 so that the guide 10 is securely locked at the selected angle without the need for tools.

Referring now to FIG. 11, the length of the second elongated portion 54 of the guiding member 12 is selected such that when the outer face 17 of the elongated portion 13 of the locating member 11 is placed against a flat surface and the guiding member 12 is rotated until the second end 79 of the second elongated portion 54 of the guiding member 12 contacts the flat surface, the guide 10 is set to 45 degrees. In this way the second end 79 of the second elongated portion 54 of the guiding member 12 is a stop means for precisely setting the guide 10 to 45 degrees without visual reference to the angle gauge 65. This selected length of the second elongate portion 54 also assures that the guide 10 provides a full guiding surface for a saw for angles between 45 and 90 degrees, and up to 135 degrees when the guide 10 is inverted. As shown in FIG. 12, when the guiding member 12 is rotated until the diagonal web 80 of the guiding member 12 contacts the diagonal web 43 of the locating member 11, the guide 10 is set to 90 degrees, providing a stop means for precisely setting the guide 10 to 90 degrees without visual reference to the angle gauge 65.

The above described guide 10 is a light, simple and portable guide for saws. The integrated clamp allows carrying and handling of the guide 10 with one hand, making the guide 10 particularly suitable for roof work such as "trim and fit cuts" The two sided design allows the guide 10 to be used either right or left on the top or the bottom of a board. The portability, two sided design, and integrated clamp also make the guide 10 suitable for cutting posts already set in the ground. The guide 10 is foldable to 0 degrees for convenient storage.

Although the present invention has been described with a certain degree of particularity, it is understood that the present disclosure has been made by way of example and that changes in details of structure may be made without departing from the spirit thereof.

What is claimed is:

1. A guide for guiding a saw along a straight line relative to an edge of a material being cut comprising:

a locating member having a first support surface, a spaced, oppositely facing second support surface, a first locating means extending normal to said first support surface and a second locating means extending normal to said second support surface, and a guiding member pivotally connected by a locking pivot member to said locating member to move about a pivot axis extending through said locking pivot member and rotatable relative to said locating member through a range of angles up to 90 degrees, said guiding member having a guiding surface for guiding said saw, said locating and guiding members having coacting stop portions at adjacent ends to stop said rotation at 90 degrees, said locking pivot member in the form of a threaded bolt extending through said locating and guiding members and a nut threaded on said bolt for manually locking said guiding member at any selected angle between 0 and 90 degrees relative to said locating member, said first support surface supporting said locating member on said material with said first locating means locating said guiding surface relative to said edge for a first range of selected angles, said locating member and said guiding member being invertible with said second support surface supporting said locating member on said material with said second locating means locating said guiding surface relative to said edge for a second range of selected angles, and said locking pivot member does not extend beyond planes defined by said first defined by said first support surface and said second support surface so as to not interfere with the location of the guide.

2. The guide as set forth in claim 1 wherein said locating member has a clamping head receiving portion to receive a clamping head of a clamp to enable securing said locating member to said material.

3. The guide as set forth in claim 2 wherein said clamping head receiving portion includes spaced, oppositely opening first and second clamp slots each having space, opposed first and second grooves.

4. The guide as set forth in claim 1 wherein said locating member has a first mating face and said guiding member has a second mating face juxtaposed against said first mating face, said nut threaded on said bolt pressing said first and second mating faces together.

5. The guide as set forth in claim 4 wherein said bolt extends through said first and second mating faces, said nut being recessed in and movable with a wall forming a well in a tightening member having a plurality of spokes extending radially outward from said wall for manually tightening said nut.

6. The guide as set forth in claim 1 wherein said locating member has an angle gauge for visually selecting said angle.

7. The guide as set forth in claim 1 wherein said locating member has a second stop portion at one end for precisely manually setting said angle at 45 degrees.

8. An angle guide for guiding a saw along a straight line relative to an edge of a material being cut comprising:

a locating member having a first support surface with a perpendicularly extending first flange, a spaced, oppositely facing second support surface with a perpendicularly extending second flange, and a circular mating face, and a guiding member pivotally connected by a locking pivot member to said locating member to move about a pivot axis extending through said locking pivot member and rotatable relative to said locating member, said guiding member having a first support surface that is co-planar with said first support surface of said locating member, a second support surface that is co-planar with said second support surface of said locating member, a mating face juxtaposed against said mating face of said locating member, said guiding member having a guiding surface for guiding said saw, said locating and guiding members having coacting first stop portions at adjacent ends to stop said rotation at 90 degrees, said locking pivot member in the form of a threaded bolt having a head and a nut threaded on said bolt for manually locking said guiding member at a relative angle between 0 and 90 degrees relative to said locating members;

said bolt extending through said first and second mating faces, said head being recessed below said first support surface of said locating member, said nut being recessed in and movable with a wall forming a well in a tightening member having a plurality of spokes extending radially outward from said wall for manually tightening said nut, said locating member having and angle gauge for visually selecting said angle, said guiding member having a second stop portion at one end for precisely manually setting said angle at 45 degrees, and said first support surface of said locating member and said first support surface of said guiding member supporting said locating member and said guiding member on said material with said first flange locating said guiding surface relative to said edge for a first range of selected angles, said locating member and said guiding member being invertible with said second support surface of said locating member and said second support surface of said guiding member supporting said locating member and said guiding member on said material and said second flange locating said guiding surface relative to said edge for a second range of selected angles.

\* \* \* \* \*